United States Patent
Dennison

(10) Patent No.: US 10,240,956 B2
(45) Date of Patent: Mar. 26, 2019

(54) THERMAL FLOWMETER

(71) Applicant: CDI Meters, Inc., Woburn, MA (US)

(72) Inventor: Roger Dennison, Lexington, MA (US)

(73) Assignee: CDI Meters, Inc., Woburn, MA (US)

( * ) Notice: Subject to any disclaimer, the term of this patent is extended or adjusted under 35 U.S.C. 154(b) by 239 days.

(21) Appl. No.: 15/132,762

(22) Filed: Apr. 19, 2016

(65) Prior Publication Data

US 2016/0305808 A1    Oct. 20, 2016

Related U.S. Application Data

(60) Provisional application No. 62/149,820, filed on Apr. 20, 2015.

(51) Int. Cl.
*G01F 1/684* (2006.01)
*G01F 15/00* (2006.01)

(52) U.S. Cl.
CPC ............ *G01F 1/6842* (2013.01); *G01F 15/00* (2013.01)

(58) Field of Classification Search
CPC ........ G01F 1/6842; G01F 15/00; G01F 1/684; G01F 1/68
See application file for complete search history.

(56) References Cited

U.S. PATENT DOCUMENTS

| | | | | |
|---|---|---|---|---|
| 4,199,981 A | * | 4/1980 | Young | F16K 7/16 73/204.19 |
| 5,347,876 A | * | 9/1994 | Kang | G01F 1/708 73/195 |
| 2005/0223794 A1 | * | 10/2005 | Zurek | G01F 1/6842 73/202.5 |
| 2009/0272187 A1 | * | 11/2009 | Sukegawa | G01F 1/684 73/204.27 |
| 2015/0192442 A1 | * | 7/2015 | Olin | G01F 1/692 73/204.26 |

* cited by examiner

*Primary Examiner* — Xin Y Zhong
(74) *Attorney, Agent, or Firm* — Brian M. Dingman; Dingman IP Law, PC

(57) ABSTRACT

A flowmeter of the thermal type, having a heated flow-sensing probe and a temperature-sensing reference probe, in which the flow is passed through nozzles to form two jets and those jets are directed at the heated portion of the heated probe and the temperature-sensing portion of the reference probe, while flow around the supporting portion of the heated probe is minimized. Such a flowmeter allows low gas flows to be measured without the use of capillary elements that are subject to plugging and can create unwanted pressure drops.

7 Claims, 3 Drawing Sheets

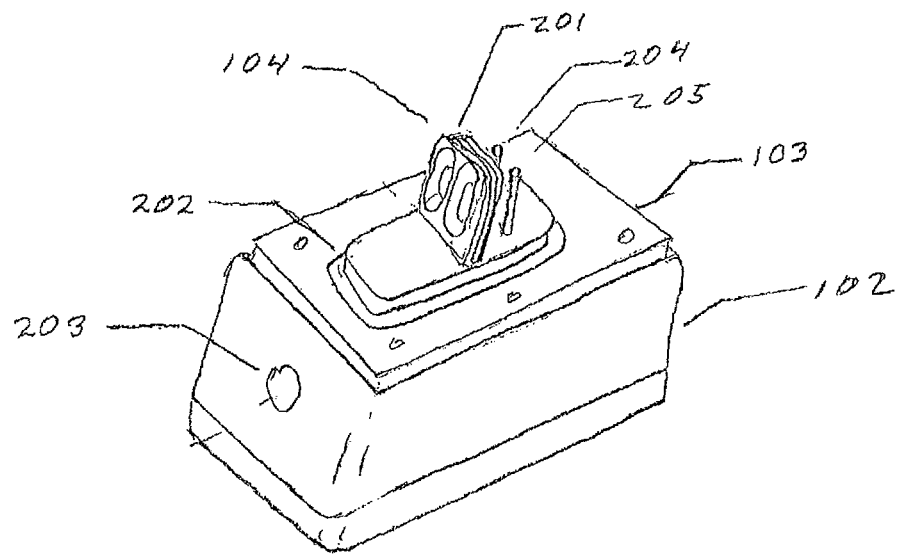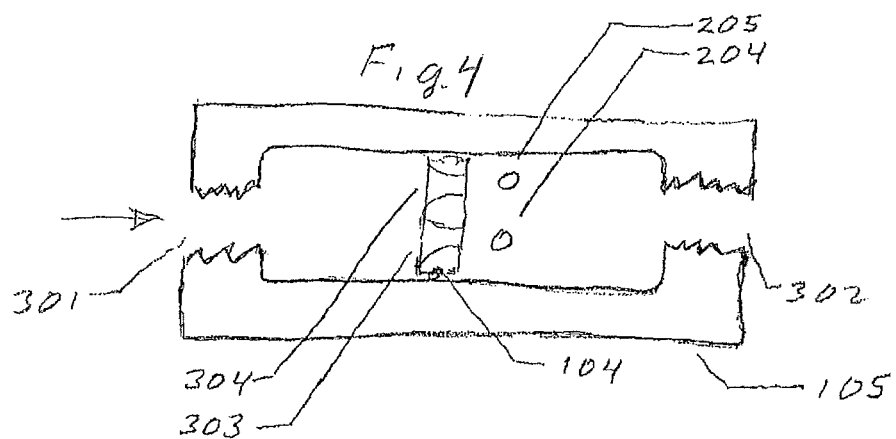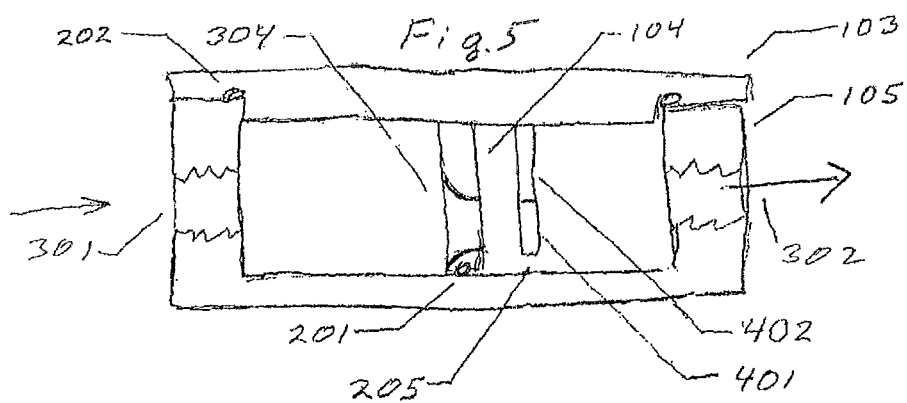

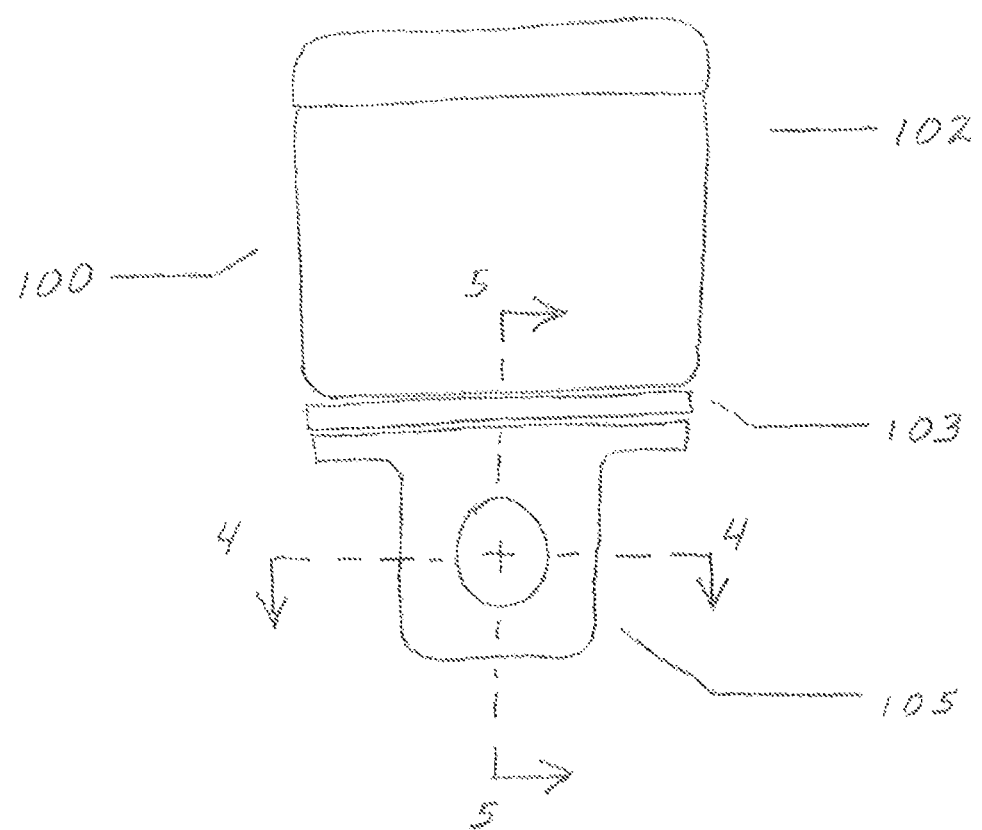

THERMAL FLOWMETER

CROSS-REFERENCE TO RELATED APPLICATION

This application claims priority of Provisional Patent Application 62/149,820 filed on Apr. 20, 2015, the entire disclosure of which is incorporated herein by reference.

FIELD

A thermal flowmeter for use in situations where a limited amount of gas flow is to be metered and a small pressure drop through the meter is acceptable.

BACKGROUND

Flowmeters for low gas flows frequently incorporate small passages that require very clean gas to avoid becoming plugged. Also, they can be difficult to disassemble for cleaning or repair. Further, flowmeters can cause significant pressure drop.

SUMMARY

The subject flowmeter operates on the known thermal principle, by which one probe senses the temperature of the fluid and a second is heated to a fixed differential above that temperature, the amount of heat required being a measure of the mass flow rate. The subject flowmeter is adapted for situations in which a limited amount of flow is available and a small but significant pressure drop in the flowing fluid is acceptable.

Each probe comprises a distal tip. The tips of both probes can contain means for temperature sensing (e.g., a resistance temperature detector (RTD) or a thermistor). The means for temperature sensing can also be used for heating, or other known devices can be used for heating the tip of the heated probe. Both probes can also comprise a supporting post for the tip. In the heated probe, the post necessarily conducts some heat away from the tip, much of this heat then being transferred to the surrounding fluid. If the post is exposed to rapidly-moving fluid, its temperature drops off close to the tip, and it conducts heat away from the tip rapidly. If it is exposed to slow-moving fluid, its temperature drops off gradually along its length and it conducts heat away from the tip slowly. If the velocity of the surrounding fluid changes suddenly, the temperature profile of the post does not change instantaneously, and since the heat transfer along the post is determined by the temperature profile along the post, there is a lag in the response of the heat removal from the tip to the change in flow; this slows the response of the meter to a change in flow.

The flowmeter typically comprises a body containing a first chamber and a second chamber, with a baffle separating the two chambers. The baffle contains two openings or nozzles through which fluid can flow from the first chamber into the second. The two probes are located in the second chamber, so disposed that their tips are immediately downstream of the two nozzles, and the jets of fluid from the nozzles strike the tips of the probes but have minimal influence on the respective posts. The two probes are preferably but not necessarily designed to be physically identical and they are arranged to be identically influenced by the moving air for two reasons. First, if there is a rapid change in the temperature of the approaching gas, the two probes must respond in concert, so that the temperature difference between them is not affected. Second, the temperature of the flowing gas will be reduced by adiabatic expansion as the gas accelerates through the nozzles, and this effect will vary with system temperature and pressure, causing errors that would not be compensated for by calibration at a single temperature and pressure. If only the heated probe were exposed to a concentrated jet of air and the reference probe were exposed to the air entering the meter, performance might be acceptable at low flow rates and at pressures close to that at which the meter was calibrated. However, performance over a wide range of flow rates, temperatures and pressures could be unsatisfactory, depending on the usage of the flowmeter.

The flowmeter uses the limited available flow to best advantage to extract heat from the heated probe and drive the output of the flowmeter, while the temperature profile of the supporting post remains relatively constant as the flow changes, and the lag due to the above-mentioned thermal behavior of the post is minimized. It does this while maintaining essentially identical thermal and flow conditions around the two probes, so that they will respond together to changes in fluid temperature and not be unduly influenced by variations in system pressure and temperature.

The design of the flowmeter is optimized for a given allowable pressure drop and flow range by sizing the nozzles so that they create a pressure drop close to the allowable value when the flow is at the maximum of the design range. The design of the flowmeter is such that other pressure drops within it are relatively small. Because of the large acceleration of the fluid on entering the nozzles, the effects of velocity distortions in the fluid entering the flowmeter are small. Because the nozzles are as small as possible given the maximum flow and the allowable pressure drop of the flowmeter, the velocity of the fluid passing the heated tip is maximized at the low end of the flow range, providing sufficient velocity for a clear, stable signal.

Flowmeters for small gas flows frequently incorporate small passages that require very clean gas to avoid becoming plugged. The subject flowmeter has no small passages, and it is preferably constructed to facilitate disassembly for cleaning. Also, because the only significant pressure drop required is that to accelerate the flow past the probes, it will often have less pressure drop than alternative designs.

BRIEF DESCRIPTION OF THE DRAWINGS

Other objects, features and examples will occur to those skilled in the art from the following description and the accompanying drawings, in which:

FIG. 2 is view of the top assembly at an angle from below, showing the probes and the baffle mounted to the cover.

FIG. 3 is an end view of the assembled flowmeter.

FIG. 4 is horizontal cross section through the flowmeter, showing the path of the flow.

FIG. 5 is a partial vertical sectional view through the flowmeter again showing the path of the flow.

DETAILED DESCRIPTION

Figure 1:
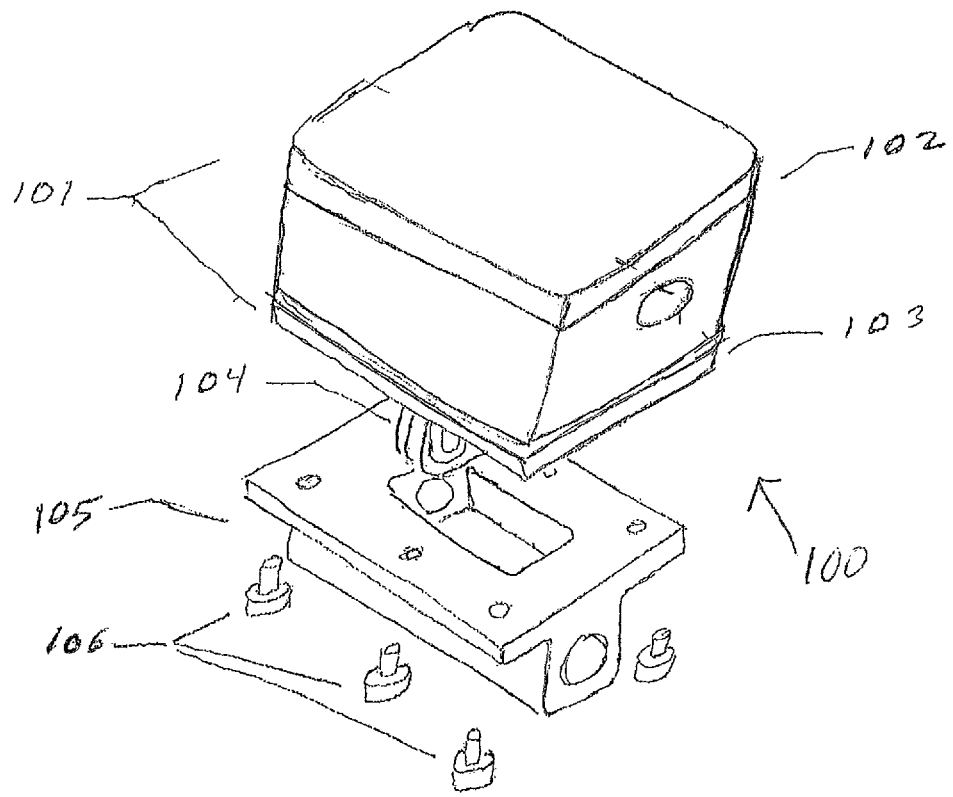
FIG. 1 is an angled view of the flowmeter, partially disassembled, showing the top assembly separated from the base.

FIG. 1 is an angled view of a flowmeter 100 showing the top assembly 101 separated from the base 105. The top assembly includes an electronics enclosure 102, a cover 103 and a baffle 104. The electronics enclosure and the baffle are held to the cover with screws (not shown). When assembled, the base is held to the cover with screws 106.

FIG. 2 is an angled view of the underside of the top assembly 101. The electronic enclosure 102 includes a connector 203 for power. It also contains an electronic circuit to measure and display flow (not shown). Reference probe 204 and heated probe 205 are glued into cover 103 and connected to the measurement circuit by wires (not shown). Baffle 104 includes a gasket 201 that seals against the base so as to minimize leakage around the baffle. O-ring 202 recessed into cover 103 provides a seal against base 105.

FIG. 3 is an end view of the assembled flowmeter 100, showing the electronics enclosure 102, cover 103 and base 105.

FIG. 4 is a horizontal sectional view (taken along line 4-4, FIG. 3) through the base 105, the baffle 104 and the probes 204 and 205 showing the path of the air through the meter. Air enters through threaded port 301 and then accelerates as it passes through openings 303 and 304 in baffle 205. The openings are identical, and each is preferably in the shape of a vertically-elongated nozzle with a generously curved entry. The curved entries cause the flow to follow the surface of the nozzle as it approaches the throat, creating a jet of flow with close to uniform velocity across its width. Elongated jets are thus formed immediately upstream of probes 204 and 205. The dimension of each opening lengthwise along the probe is roughly equal to the length of the tip of the probe, while the width of each opening is such as to provide close to the maximum acceptable pressure drop when the maximum intended flow is passing through the meter. After striking the two probes, the fluid passes out of the meter through threaded opening 302.

FIG. 5 is a vertical sectional view (taken along line 5-5, FIG. 3) through the cover 103, the base 105, the baffle 104, and showing probe 205, probe 204 being behind the plane of this view. Heated probe 205 includes heated tip 401 and support post 402. A single stainless-steel tube typically forms the support post and the outside of the heated tip. Nozzle-shaped opening 304 is positioned immediately upstream of heated tip 401 so that the jet of fluid will envelop the tip but little of it will strike the support post 402. Reference probe 204 (not shown) is constructed similarly to heated probe 205. However, its tip is not heated beyond the small amount of heat that is generated as a result of its temperature-sensing function. It is mounted in the same relation to nozzle 303 as heated probe 205 has to nozzle 304. Gasket 201, between the baffle and the base, and gasket 202, between the base and the cover, are shown in section in this view.

A design example for the subject flowmeter is detailed below. This example is not limiting but is illustrative of one of many possible examples of the invention. Thus the example does not limit the scope of the invention.

Design Example

A flowmeter is to be designed to meter compressed air under the following conditions:
20 standard cubic feet per minute (scfm) maximum flow
0.5 psi allowable pressure drop at maximum flow
0.0752 lbm mass of one standard cubic foot of air
68 degrees F. temperature at which air is defined and temperature at which meter operates
14.7 psia absolute pressure at which standard air is defined
114.7 psia absolute pressure (corresponding to 100 psi gauge pressure above sea-level atmospheric pressure)
0.493 inch inside diameter of connecting pipes The nozzles are to be sized to take advantage of the allowable pressure drop across the instrument and the specified maximum flow. In addition to the pressure drop associated with the nozzle, there will be the pressure requirement to re-accelerate the air as it leaves the instrument, which is, approximately, the velocity pressure in the pipe. The flow will be divided equally between two nozzles.

The density of the air within the meter is: $\rho = 0.0752$ lbm/ft$^3$*114.7 psia/14.7 psia=0.587 lbm/ft$^3$.

The inside area of each connecting pipe is: $A_p = 0.001326$ sqft.

The velocity of the entering air is: (20 scfm*14.7/114.7)/(0.001326 sqft)=1934 ft/min=32.2 ft/sec.

The velocity pressure of the entering air is: $P_{v,e} = \rho * V^2 / 2g = 0.5868$ lbm/ft$^3$*(32.2 ft/sec)$^2$/(2*32.2 ft/sec$^2$)=9.455 lb/ft$^2$=0.07 psi.

We are thus allowed a maximum pressure drop at the nozzle of: 0.5 psi−0.07 psi=0.43 psi=62 lb/ft$^2$.

The nozzles are designed with a generously rounded inlet, giving them a discharge coefficient close to 1.00. The nozzle throat is small enough in relation to the upstream area that we can ignore the upstream velocity. Consequently, the pressure loss across the nozzle is simply the velocity pressure at its throat.

Knowing the velocity pressure, we calculate the throat velocity:

$$P_{v,t} = \rho * V_t^2 / 2*g$$

$$V_t = \sqrt{P_{v,t} * 2 \, g/\rho} = \sqrt{62 \text{ lb/ft}^2 * 2 * 32.2 \text{ ft/sec}^2 / 0.5868 \text{ lbm/ft}^3} = 82.5 \text{ ft/sec} = 4950 \text{ ft/min}.$$

Where:
Vt is the velocity at the throat of each of the nozzles
Pv,t is velocity pressure at the throat of each nozzle
ρ is the density of the compressed air (compressibility at the nozzle is ignored)
g is the acceleration of gravity, 32.2 ft/sec$^2$ We then calculate the total area of the two nozzles on the basis of the known flow, the density of the air, and the velocity: (20 scfm*14.7/114.7)/(4950 ft/min)=0.000518 sqft=0.0746 sqin The calculation is not meant to be exact, but to provide a reasonable first approximation of the sizing required.

Features of the invention are shown in some drawings and not others, and may not all be shown in the same drawing. The examples and description above support but do not limit the scope of the invention.

What is claimed is:

1. A flowmeter of the thermal type, where the flowmeter is adapted to have fluid passed through it along a fluid flow path, the flowmeter comprising:
   a body that defines the entire fluid flow path through the flowmeter;
   a baffle in the body and arranged such that it entirely blocks the fluid flow path, the baffle defining first and second chambers in the body arranged serially relative to the fluid flow, the baffle having only first and second openings, the first and second openings arranged to pass the entire fluid flow from the first chamber into the second chamber;
   wherein the first opening defines an inlet open to the first chamber and an outlet open to the second chamber to create a first fluid jet in the second chamber;
   wherein the second opening defines an inlet open to the first chamber and an outlet open to the second chamber, to create a second fluid jet in the second chamber;
   a heated probe in the second chamber, with a heated portion immediately downstream of the first opening and arranged such that the heated portion is in the first jet; and a reference probe in the second chamber, with a temperature-sensing portion immediately downstream of the second opening and arranged such that the temperature-sensing portion is in the second jet.

2. The flowmeter of claim 1, wherein the first opening is a first nozzle with its inlet wider than its outlet, and wherein the second opening is a second nozzle with its inlet wider than its outlet.

3. The flowmeter of claim 2, wherein the flowmeter is constructed and arranged to pass a maximum amount of flow at a maximum allowable pressure drop, and wherein the jets each have an area, and wherein the areas of the jets are as small as possible while still passing the required maximum amount of flow at the maximum allowable pressure drop.

4. The flowmeter of claim 3, wherein the heated portion of the heated probe is in a distal tip of the heated probe, and wherein the temperature-sensing portion of the reference probe is in a distal tip of the reference probe.

5. The flowmeter of claim 4, wherein the heated probe comprises a support post that supports the distal tip, and wherein the reference probe comprises a support post that supports the distal tip, and wherein the support posts are each located proximate but not in front of a nozzle.

6. The flowmeter of claim 1, wherein the heated probe and the reference probe are identical.

7. The flowmeter of claim 1, comprising two separable parts that are coupled together, with the probes and the baffle all in one of the two parts.

* * * * *